(12) United States Patent
Fitzgerald

(10) Patent No.: US 7,503,139 B1
(45) Date of Patent: Mar. 17, 2009

(54) FISHING ASSISTANCE APPARATUS

(76) Inventor: Terry J. Fitzgerald, 801 Swallow Ct., Slidell, LA (US) 70461

( * ) Notice: Subject to any disclaimer, the term of this patent is extended or adjusted under 35 U.S.C. 154(b) by 454 days.

(21) Appl. No.: 11/167,761

(22) Filed: Jun. 28, 2005

(51) Int. Cl.
  *A01K 97/14* (2006.01)
(52) U.S. Cl. ............................................. 43/5; 294/26
(58) Field of Classification Search ................. 43/5, 43/6; 294/26; 119/801; 463/47.2, 47.4
  See application file for complete search history.

(56) References Cited

U.S. PATENT DOCUMENTS

| | | | | |
|---|---|---|---|---|
| 417,578 A | * | 12/1889 | McNeill | 294/26 |
| 442,470 A | * | 12/1890 | Willeford | 463/47.4 |
| 827,246 A | * | 7/1906 | Livingston | 43/5 |
| 1,339,257 A | * | 5/1920 | Callahan | 294/26 |
| 1,404,117 A | * | 1/1922 | Hanson | 294/26 |
| 1,490,651 A | * | 4/1924 | Waldorf | 463/47.2 |
| 1,596,631 A | * | 8/1926 | Seibold | 294/26 |
| 2,496,822 A | * | 2/1950 | Stoddard | 294/26 |
| 2,570,538 A | * | 10/1951 | Fincher et al. | 294/26 |
| 2,570,688 A | * | 10/1951 | Keegan | 294/26 |
| 2,586,245 A | * | 2/1952 | McRae | 294/26 |
| 2,757,002 A | * | 7/1956 | Ryden | 43/4 |
| 2,877,045 A | * | 3/1959 | Payne | 43/5 |
| 3,085,824 A | * | 4/1963 | Johnson | 294/26 |
| 3,092,925 A | * | 6/1963 | Ho et al. | 43/5 |
| 3,284,865 A | * | 11/1966 | Burnham | 294/26 |
| 3,311,398 A | * | 3/1967 | Erhardt | 294/26 |
| 3,555,718 A | * | 1/1971 | Montgomery | 43/53.5 |
| 3,848,689 A | * | 11/1974 | Hilterhaus | 294/26 |
| 3,863,377 A | * | 2/1975 | Leonard | 43/6 |
| 3,991,502 A | * | 11/1976 | Tudisco | 43/5 |
| 4,098,503 A | * | 7/1978 | Antone | 294/168 |
| 4,351,126 A | * | 9/1982 | Simonson | 43/5 |
| 4,378,113 A | * | 3/1983 | Piccini | 482/110 |
| 4,660,875 A | * | 4/1987 | Ziegler | 294/26 |
| 4,739,573 A | * | 4/1988 | Robertson | 43/5 |
| 4,807,916 A | * | 2/1989 | Erickson | 294/26 |
| 4,836,541 A | * | 6/1989 | Henley | 473/457 |
| 4,881,338 A | * | 11/1989 | Lung | 43/5 |
| 5,205,194 A | * | 4/1993 | Rodey | 294/26 |
| 5,228,226 A | * | 7/1993 | Porosky | 43/5 |
| 5,520,134 A | * | 5/1996 | Walker | 114/230.25 |
| D372,294 S | * | 7/1996 | Grimaldi, II | D22/134 |
| 5,548,917 A | * | 8/1996 | Holwadel | 43/1 |
| 5,628,538 A | * | 5/1997 | Ericksen | 43/4 |
| 5,630,381 A | * | 5/1997 | Kroyer | 119/801 |
| 5,738,080 A | * | 4/1998 | Brocco, Jr. | 124/86 |
| 5,896,668 A | * | 4/1999 | Murrell | 294/26 |
| 5,946,844 A | * | 9/1999 | Stoliar et al. | 43/17.2 |
| 6,293,601 B1 | * | 9/2001 | Johnson | 294/26 |

(Continued)

FOREIGN PATENT DOCUMENTS

DE 29812925 U1 * 11/1998

(Continued)

*Primary Examiner*—Darren W Ark

(57) ABSTRACT

A fishing assistance apparatus. The fishing assistance apparatus is fabricated from a club that has two ends, a handle end and a distal end. The handle end has a strap for grasping by a hand, while the distal end of the club has a gaff hook, which extends outward to the distal end and then bends backward one-hundred eighty degrees. An individual could grasp the handle end of the fishing assistance apparatus and use both the distal end of the club and the gaff hook in combination with each other to successfully pull a game fish onto a boat, pier, or the like.

3 Claims, 2 Drawing Sheets

U.S. PATENT DOCUMENTS

| | | | |
|---|---|---|---|
| 6,405,684 B1 * | 6/2002 | Ferran et al. | 119/801 |
| 6,526,691 B1 * | 3/2003 | Maddox | 43/53.5 |
| 6,574,905 B2 * | 6/2003 | Peeples | 43/5 |
| 6,857,217 B1 * | 2/2005 | Herbst et al. | 43/5 |
| 6,898,891 B1 * | 5/2005 | Needham | 43/4 |
| 2006/0021586 A1 * | 2/2006 | Jezl | 119/801 |
| 2007/0074445 A1 * | 4/2007 | Hei | 43/5 |

FOREIGN PATENT DOCUMENTS

| | | | |
|---|---|---|---|
| DE | 29906608 U1 * | 7/1999 |
| DE | 202006001850 U1 * | 5/2006 |
| DE | 102006012160 A1 * | 9/2007 |
| JP | 01199532 A * | 8/1989 |
| JP | 03164123 A * | 7/1991 |
| JP | 10286053 A * | 10/1998 |
| JP | 2000292249 A * | 10/2000 |

* cited by examiner

FISHING ASSISTANCE APPARATUS

BACKGROUND OF THE INVENTION

The present invention concerns that of a new and improved fishing assistance apparatus.

DESCRIPTION OF THE PRIOR ART

U.S. Pat. No. 4,739,573, issued to Robertson, discloses a fish gaff that comprises a gaff hook releasably attached to a handle by either spring tension or compression.

U.S. Pat. No. 4,881,338, issued to Lung, discloses a gaff hook having a tubular body of a plurality of telescoping sections.

U.S. Pat. No. 2,966,621, issued to Voll, discloses a safety apparatus for policemen and guards.

U.S. Pat. No. D302,231, issued to Millar, Jr., discloses an ornamental design for a boat hook.

U.S. Pat. No. 4,778,181, issued to Arney, discloses a hand tool for use by truck drivers and policemen.

SUMMARY OF THE INVENTION

The present invention concerns that of a new and improved fishing assistance apparatus. The fishing assistance apparatus is fabricated from a club that has two ends, a handle end and a distal end. The handle end has a strap for grasping by a hand, while the distal end of the club has a gaff hook, which extends outward to the distal end and then bends backward one-hundred eighty degrees. An individual could grasp the handle end of the fishing assistance apparatus and use both the distal end of the club and the gaff hook in combination with each other to successfully pull a game fish onto a boat, pier, or the like.

There has thus been outlined, rather broadly, the more important features of a fishing assistance apparatus that the detailed description thereof that follows may be better understood and in order that the present contribution to the art may be better appreciated. There are, of course, additional features of the fishing assistance apparatus that will be described hereinafter and which will form the subject matter of the claims appended hereto.

In this respect, before explaining at least one embodiment of the fishing assistance apparatus in detail, it is to be understood that the fishing assistance apparatus is not limited in its application to the details of construction and to the arrangements of the components set forth in the following description or illustrated in the drawings. The fishing assistance apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present fishing assistance apparatus. It is important, therefore, that the claims be regarded as including such equivalent constructions insofar as they do not depart from the spirit and scope of the present invention.

It is therefore an object of the present invention to provide a fishing assistance apparatus which has all of the advantages of the prior art and none of the disadvantages.

It is another object of the present invention to provide a fishing assistance apparatus which may be easily and efficiently manufactured and marketed.

It is another object of the present invention to provide a fishing assistance apparatus which is of durable and reliable construction.

It is yet another object of the present invention to provide a fishing assistance apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
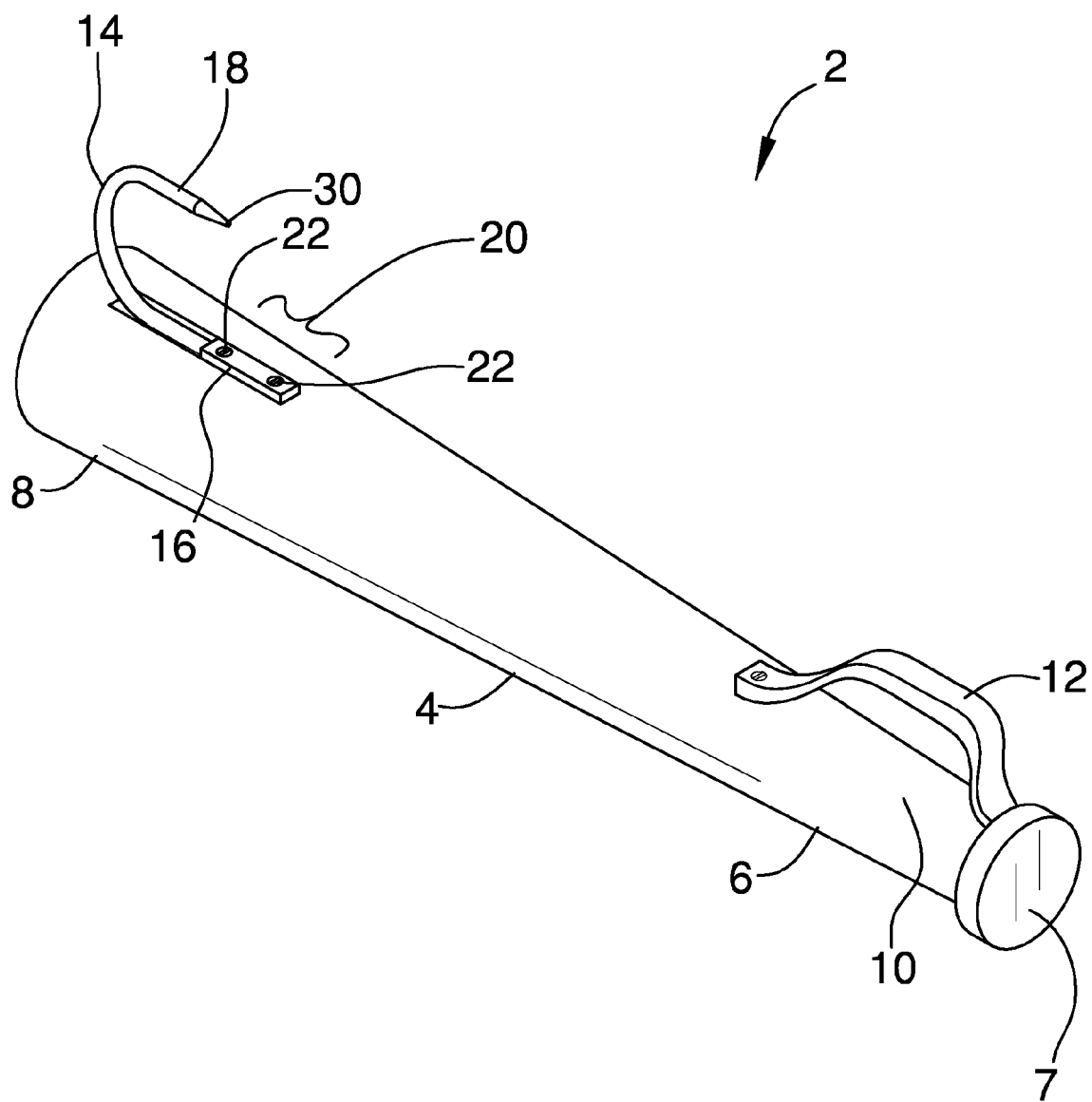
FIG. 1 shows a perspective view of the fishing assistance apparatus.
Figure 2:
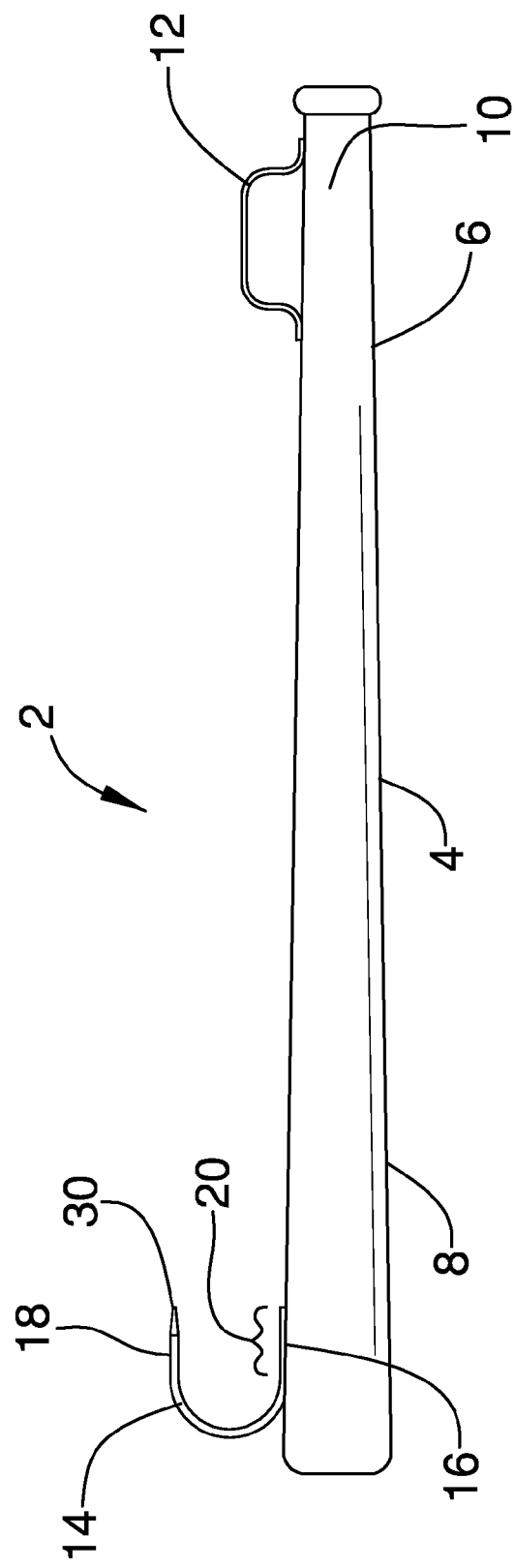
FIG. 2 shows a side view of the fishing assistance apparatus.

FIG. 1 shows a perspective view of the fishing assistance apparatus 2, while FIG. 2 shows a side view of the fishing assistance apparatus 2. Fishing assistance apparatus 2 comprises a club 4 that has two ends, a handle end 6 and a distal end 8 which defines a longitudinal axis of the club 4 therebetween. The club 4 gradually tapers from the distal end 8 to the handle end 6 such that the diameter of the club 4 along its longitudinal axis decreases from a largest diameter of the club 4 at the distal end 8 to a smallest diameter of the club 4 at the handle end 6.

Handle end 6 includes a butt 7 and a handle 10 and also includes a strap 12 that is fixedly attached to the handle 10. The butt 7 is attached to the handle 10 and has a diameter which is larger than the smallest diameter of the club 4 at the handle end 6 such that it extends laterally outward from the handle end 6. Strap 12 is preferably fabricated from something of high tensile strength such as rope or leather, which would provide for flexibility but at the same time, give the strap 12 significant durability and the ability to withstand wear-and-tear over time.

The fishing assistance apparatus 2 further includes a gaff hook 14 that is attached to the distal end 8 of the club 4. The gaff hook 14 has two ends, a first end 16 and a second end 18. The first end 16 of the gaff hook 14 abuts a lateral side of the distal end 8 of the club 4. The first end 16 of the gaff hook 14 is fixedly attached to the distal end 8 of the club 4 with attachment means 20, with the attachment means 20 preferably comprising at least a pair of screws 22 that used to secure the first end 16 of the gaff hook 14 snugly against the distal end 8 of the club 4. The gaff hook 14 is located in its entirety between the distal end 8 and the handle end 6 of the club 4, and the strap 12 is located in its entirety between the butt 7 and the gaff hook 14.

From the first end 16 of the gaff hook 14 to the second end 18 of the gaff hook 14, the gaff hook 14 essentially reaches but toward the distal end 8 of the club 4, loops around in a circular fashion, and then ends is a point 30 that is located on the second end 18 of the gaff hook 14. The area around the second end 18 of the gaff hook 14 is parallel to the first end 16 of the gaff hook 14, with the looping around having looped around one-hundred eighty (180) degrees.

The fishing assistance apparatus 2 would come in vary handy when fishing, once a game fish had been brought in the vicinity of a boat, dock, pier, etc. Once the game fish is near, the individual could grab the fishing assistance apparatus 2 by placing their hand through the strap 12. Then, the game fish, if it is still putting up a fight could be clubbed using the distal end 8 of the club 4. Once the fish is rendered unconscious, then the gaff hook 14 could be used to hook the fish by the gills or mouth and pull the game fish up to a more secure location, such as a pail, holding tank, or something similar.

What I claim as my invention is:

1. A fishing assistance apparatus comprising:
   (a) a club having two ends comprising a handle end and a distal end which define a longitudinal axis of the club therebetween, the club gradually tapering from the distal end to the handle end such that the diameter of the club along the longitudinal axis decreases from a largest diameter of the club at the distal end to a smallest diameter of the club at the handle end,
   (b) a handle located at the handle end of the club, the handle further comprising a butt attached thereto, the butt having a diameter which is larger than the smallest diameter at the handle end and extending laterally outward from the handle end,
   (c) a strap fixedly attached to the handle,
   (d) a gaff hook attached to the distal end of the club, the gaff hook having two ends comprising a first end and a second end, the first end of the gaff hook abutting a lateral side of the distal end of the club, the gaff hook looping around in between the first end of the gaff hook and the second end of the gaff hook, wherein the gaff hook loops around one hundred eighty degrees in between the first end of the gaff hook and the second end of the gaff hook, the gaff hook located in its entirety between the distal and handle ends of the club, the strap located in its entirety between the butt and the gaff hook,
   (e) means for attaching the first end of the gaff hook to the distal end of the club comprising:
      (i) at least a pair of screws, and
      (ii) wherein the pair of screws are inserted through the first end of the gaff hook and screwed into the distal end of the club, and
   (f) a point located at the second end of the gaff hook.

2. A fishing assistance apparatus according to claim 1 wherein the strap is fabricated from rope.

3. A fishing assistance apparatus according to claim 1 wherein the strap is fabricated from leather.

* * * * *